(12) United States Patent
Shiraki et al.

(10) Patent No.: US 8,892,328 B2
(45) Date of Patent: Nov. 18, 2014

(54) ELECTRIC PARKING BRAKE CONTROL DEVICE

(75) Inventors: Takahiro Shiraki, Toyota (JP); Naoki Yabusaki, Toyota (JP); Tsuyoshi Ando, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/701,966

(22) PCT Filed: Aug. 10, 2011

(86) PCT No.: PCT/JP2011/004535
§ 371 (c)(1),
(2), (4) Date: Dec. 4, 2012

(87) PCT Pub. No.: WO2013/021424
PCT Pub. Date: Feb. 14, 2013

(65) Prior Publication Data
US 2014/0149012 A1    May 29, 2014

(51) Int. Cl.
*G06F 7/70* (2006.01)
*B60T 7/12* (2006.01)
*B60T 13/74* (2006.01)
*B60T 13/66* (2006.01)

(52) U.S. Cl.
CPC ............. *B60T 7/12* (2013.01); *B60T 13/741* (2013.01); *B60T 13/662* (2013.01)
USPC ............................................. 701/70; 701/22

(58) Field of Classification Search
CPC .......... B60T 8/1755; B60T 8/17; B60T 13/74
USPC ................................................ 701/70, 22, 36
See application file for complete search history.

(56) References Cited

U.S. PATENT DOCUMENTS

2004/0113486 A1* 6/2004 Koga et al. ..................... 303/20

FOREIGN PATENT DOCUMENTS

| JP | A-2002-225701 | 8/2002 |
| JP | A-2005-119343 | 5/2005 |
| JP | A-2009-226964 | 10/2009 |

* cited by examiner

*Primary Examiner* — Thomas G Black
*Assistant Examiner* — Luke Huynh
(74) *Attorney, Agent, or Firm* — Oliff PLC

(57) ABSTRACT

An EPB-ECU is an electric parking brake control device which generates a braking force by driving an electric motor to press pads and to a disc rotor. The EPB-ECU includes a current supply unit for supplying a motor current to the electric motor and stopping the supply of the motor current when the motor current reaches a predetermined target current value, a supply time measurement unit for measuring a supply time of the motor current, a waiting time setting unit for setting a waiting time from when the supply of the motor current is stopped to when the supply of the motor current is restarted next time on the basis of the measured motor current supply time, and a control unit for instructing the current supply unit to supply the motor current according to the set waiting time.

5 Claims, 5 Drawing Sheets

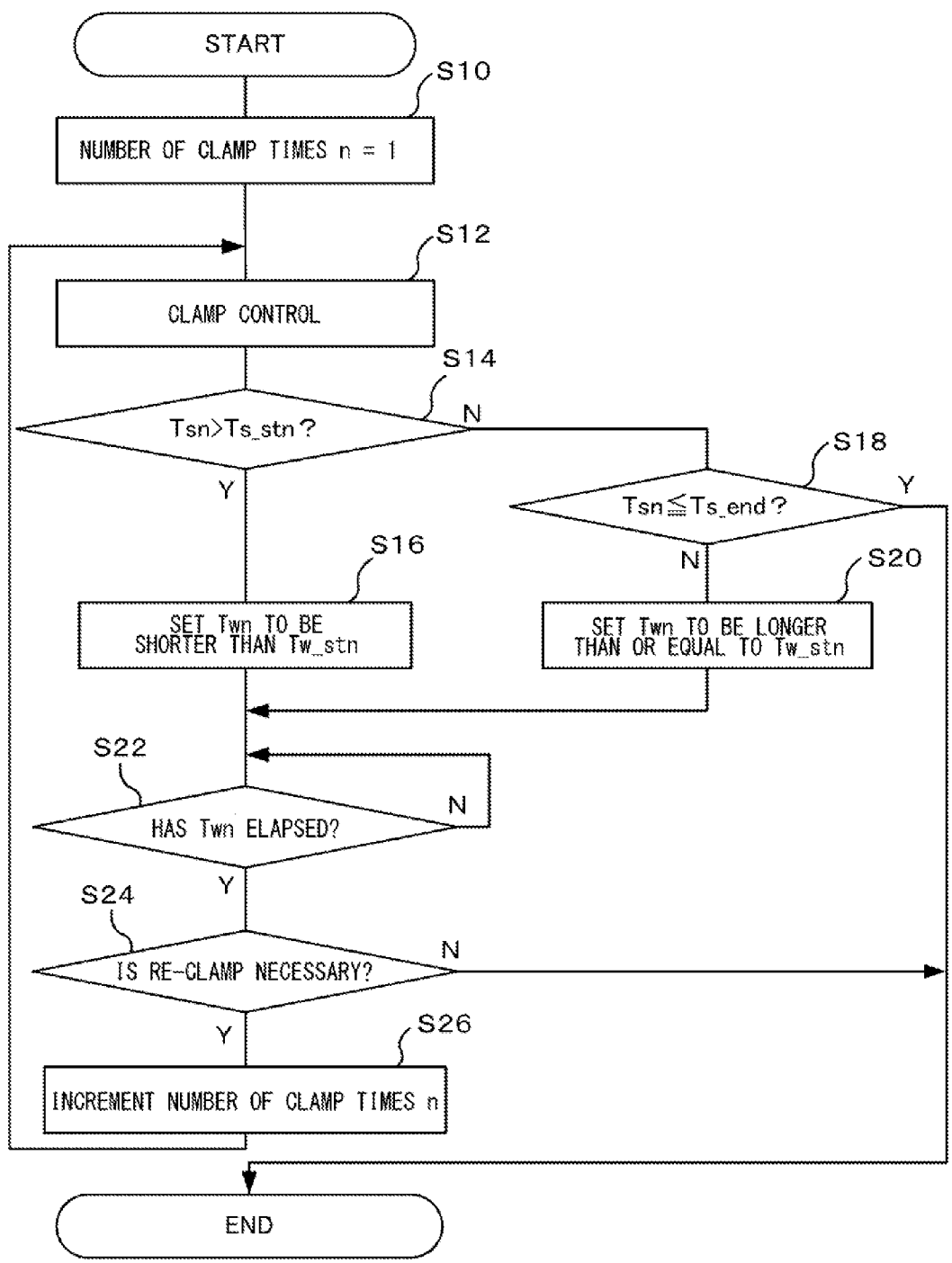

ELECTRIC PARKING BRAKE CONTROL DEVICE

TECHNICAL FIELD

The present invention relates to an electric parking brake control device for controlling an electric parking brake.

BACKGROUND ART

Generally, a parking brake is mounted on a vehicle in addition to a hydraulic brake such as a service brake, which generates a braking force by hydraulic pressure. The simplest parking brake generates a braking force when an operation lever is pulled, a wire is driven, and a brake pad is activated.

In recent years, an electric parking brake (EPB) is employed, which drives an electric motor to generate or release a braking force when a driver operates an operation switch. In the electric parking brake, when the electric motor is driven, a brake pad is pressed against a disc rotor, so that the braking force is generated.

By the way, when the electric parking brake is activated to park a vehicle, the pad and the disc rotor included in the parking brake are thermally expanded by heat generated by braking while the vehicle is driven. Therefore, if the parking brake is activated while the pad and the disc rotor are thermally expanded, the pad and the disk rotor are cooled and contracted as the time elapses, so that there is a risk that the braking force decreases.

Therefore, in order to maintain a necessary braking force even after time elapses, a method is proposed which compensates the braking force by re-driving the electric motor at regular time intervals after the electric parking brake is activated (for example, see Patent Literature 1).

Also, a method is proposed which estimates the temperature of the pad on the basis of a vehicle state such as a change of vehicle speed and an outside air temperature and determines the time intervals at which the electric motor is re-driven on the basis of the estimated temperature (for example, see Patent Literature 2).

CITATION LIST

Patent Literature

Patent Literature 1: Japanese Patent Application Laid-Open No. 2002-225701
Patent Literature 2: Japanese Patent Application Laid-Open No. 2005-119343

SUMMARY OF INVENTION

Technical Problem

However, in the method which re-drives the electric motor at regular intervals, if the pad and the disc rotor are cooled sooner than estimated, there is a risk that the braking force becomes smaller than a necessary value before re-driving the electric motor. Further, when the braking force does not decrease so much, electric current is uselessly supplied to the electric motor, so that the efficiency of power consumption may degrade.

In the method which estimates the temperature of the pad on the basis of the vehicle state, the temperature of the pad is affected by various factors, so that it is not easy to accurately estimate the temperature of the pad. When the estimate of the temperature of the pad is inaccurate, there is a risk that the electric motor cannot be re-driven at an appropriate timing.

The present invention is made in view of the above situation, and an object of the present invention is to provide an electric parking brake control device that can appropriately maintain the braking force.

Solution to Problem

To solve the above-described problems, an electric parking brake control device according to an aspect of the present invention for generating a braking force by driving an electric motor to press pads to a disc rotor, the electric parking brake control device includes: a current supply unit for supplying a motor current to the electric motor and stopping the supply of the motor current when the motor current reaches a predetermined target current value; a supply time measurement unit for measuring a supply time of the motor current; a waiting time setting unit for setting a waiting time from when the supply of the motor current is stopped to when the supply of the motor current is restarted next time on the basis of the measured motor current supply time; and a control unit for instructing the current supply unit to supply the motor current according to the set waiting time.

The supply time measurement unit may measure a time in which the motor current is supplied while a load larger than or equal to a predetermined value is applied to the electric motor as the motor current supply time.

When the motor current supply time is longer than a predetermined standard supply time, the waiting time setting unit may set the waiting time to be shorter than a predetermined standard waiting time.

When the motor current supply time is shorter than or equal to the standard supply time, the waiting time setting unit may set the waiting time to be longer than or equal to the standard waiting time.

When the motor current supply time is shorter than or equal to a predetermined end determination time which is shorter than the standard supply time, the waiting time setting unit may end the next and the following supplies of the motor current.

Advantageous Effects of Invention

According to the present invention, it is possible to provide an electric parking brake control device that can appropriately maintain the braking force.

BRIEF DESCRIPTION OF DRAWINGS

FIG. 5 is a flowchart for explaining an operation of the electric parking brake device according to the embodiment of the present invention.

DESCRIPTION OF EMBODIMENTS

Hereinafter, an embodiment for carrying out the present invention will be described in detail with reference to the drawings.

Figure 1:
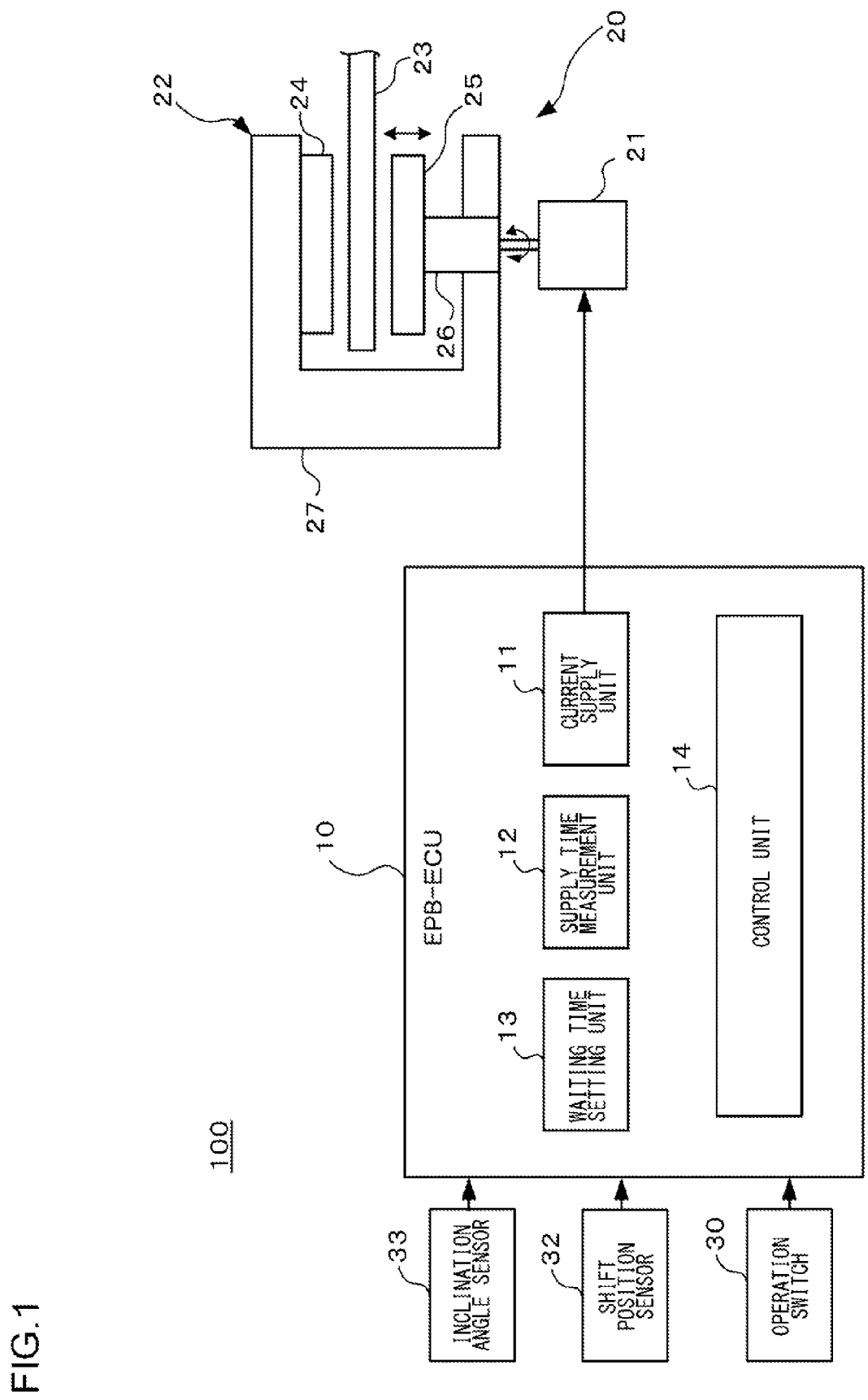
FIG. 1 is a diagram showing an electric parking brake device according to an embodiment of the present invention.

FIG. 1 shows an electric parking brake device according to the embodiment of the present invention. The electric parking brake device 100 shown in FIG. 1 includes an electric parking brake 20, an EPB-ECU (Electronic Control Unit) 10 which is a control device of the electric parking brake 20, and an operation switch 30.

The electric parking brake 20 includes a disc rotor 23 that rotates with a wheel (not shown in the drawings) in an integrated manner, a caliper 22, and an electric motor 21. Inside a body 27 of the caliper 22, pads 24 and 25 are provided to sandwich a part of the disc rotor 23. One pad 24 is fixed to the body 27. The other pad 25 is attached to the body 27 through a rotation to linear movement conversion mechanism 26. The rotation to linear movement conversion mechanism 26 has a function to convert normal and reverse rotations of the electric motor 21 into a reciprocating movement in the rotation axis direction.

In the electric parking brake 20 configured as described above, when the electric motor 21 rotates in the normal direction, the pad 25 is moved toward the disc rotor 23 via the rotation to linear movement conversion mechanism 26. Thereby, the disc rotor 23 is clamped by the pads 24 and 25, so that a braking force is generated. On the other hand, when the electric motor 21 rotates in the reverse direction, the pad 25 is moved away from the disc rotor 23 via the rotation to linear movement conversion mechanism 26. Thereby, the braking force is released.

The disc rotor 23 and the pads 24 and 25 are shared with a service brake used when the vehicle is driven.

The EPB-ECU 10 is configured as a microprocessor including a CPU. The EPB-ECU 10 includes an arithmetic unit which performs arithmetic calculations by a microcomputer, a ROM which stores various processing programs, a RAM which temporarily stores data and programs and which is used as a work area for storing data and executing a program, a storage device such as a hard disk which stores data, an input/output port for transmitting and receiving various signals, a driver for driving an external actuator, a sensor for detecting current and voltage, and the like. The EPB-ECU 10 controls the operation of the electric parking brake 20 by controlling the rotation of the electric motor 21.

The operation switch 30, a shift position sensor 32, and an inclination angle sensor 33 are connected to the EPB-ECU 10. For example, the operation switch 30 is provided on an instrument panel of the vehicle and provides information related to activation or release of the electric parking brake 20 inputted by a driver or the like to the EPB-ECU 10. For example, the shift position sensor 32 is provided near a shift lever and provides information indicating the position of the shift lever to the EPB-ECU 10. The inclination angle sensor 33 provides information indicating an inclination of the vehicle to the EPB-ECU 10.

The EPB-ECU 10 includes a current supply unit 11, a supply time measurement unit 12, a waiting time setting unit 13, and a control unit 14.

The current supply unit 11 supplies current (referred to as "motor current") to the electric motor 21. The current supply unit 11 starts supplying the motor current by an instruction from the control unit 14. When supplying the motor current, the current supply unit 11 monitors a motor current value Im and stops supplying the motor current when the motor current value Im reaches a predetermined target current value It. In other words, the current supply unit 11 stops supplying the motor current when Im≥It is satisfied. A rush current flows into the electric motor 21 immediately after starting the supply of the motor current, so that the motor current value may momentarily exceed the target current value It. Therefore, when the motor current value Im reaches the target current value It immediately after starting the supply of the motor current, it is desired that the current supply unit 11 does not stop supplying the motor current.

The supply time measurement unit 12 measures a supply time Ts of the motor current by the current supply unit 11. More specifically, the supply time measurement unit 12 measures a time in which the motor current is supplied while a load larger than or equal to a predetermined value is applied to the electric motor 21 as the motor current supply time Ts.

The motor current varies according to a load applied to the electric motor 21. The load applied to the electric motor 21 according to the embodiment corresponds to a reaction force of a force by which the pads 24 and 25 sandwich the disc rotor 23 (referred to as "clamp force"). Therefore, when the pads 24 and 25 are apart from the disc rotor 23 as shown in FIG. 1, even if the motor current is supplied to rotate the electric motor 21, a load is hardly applied to the electric motor 21, so that the motor current hardly flows. The motor current at this time may be referred to as "no-load current". When the pads 24 and 25 start pressing the disc rotor 23, the load applied to the electric motor 21 increases and the motor current also increases in proportion to the increase in the load. The motor current at this time may be referred to as "load current". In the embodiment, the supply time measurement unit 12 measures a time period from when a load is applied to the electric motor 21 and the motor current value Im starts increasing from the no-load current to when the motor current value Im reaches the target current value It and the supply of the motor current is stopped as the motor current supply time Ts.

The waiting time setting unit 13 sets a waiting time Tw from when the supply of the motor current is stopped to when the supply of the motor current is restarted next time on the basis of the motor current supply time Ts measured by the supply time measurement unit 12. More specifically, when the motor current supply time Ts is longer than a predetermined standard supply time Ts_st, the waiting time setting unit 13 sets the waiting time Tw to be shorter than a predetermined standard waiting time Tw_st. On the other hand, when the motor current supply time Ts is shorter than or equal to the standard supply time Ts_st, the waiting time setting unit 13 sets the waiting time Tw to be longer than or equal to the standard waiting time Tw_st. The standard supply time Ts_st and the standard waiting time Tw_st are optimal values determined by experiment, simulation, or the like under a predetermined ideal condition (initial temperatures of the pads and the disc rotor, an outside air temperature, a wind speed, and the like). The standard supply time Ts_st and the standard waiting time Tw_st will be described later.

When the motor current supply time Ts is shorter than or equal to a predetermined end determination time Ts_end, the waiting time setting unit 13 determines not to perform clamp control next time and thereafter. The end determination time Ts_end is set to be shorter than the standard supply time Ts_st.

The control unit 14 performs various controls in cooperation with the current supply unit 11, the supply time measurement unit 12, and the waiting time setting unit 13. For example, when the control unit 14 receives an activation instruction of the electric parking brake 20 from the operation switch 30, the control unit 14 causes the current supply unit 11 to start supplying the motor current. Thereby, the disc rotor 23 is clamped by the pads 24 and 25, so that the parking brake is activated. When the waiting time Tw elapses after the supply of the motor current is stopped, the control unit 14 causes the current supply unit 11 to restart supplying the motor current. Thereby, the disc rotor 23 is clamped again by the pads 24 and 25, and a decrease of the braking force is compensated.

The control unit 14 may determine whether or not to re-perform the clamp control on the basis of information from the shift position sensor 32. For example, when the shift lever is in the parking position in an automatic transmission vehicle or when a gear is engaged in a manual transmission vehicle, parking performance can be ensured even when the braking force of the parking brake decreases somewhat. Therefore, the control unit 14 may re-perform the clamp control when the shift lever is in a position other than the parking position in an automatic transmission vehicle or when no gear is engaged in a manual transmission vehicle. Thereby, it is possible to improve the power consumption efficiency.

The control unit 14 may determine whether or not to re-perform the clamp control on the basis of information from the inclination angle sensor 33. When the vehicle is parked on a slope whose slope angle is not so large, parking performance can be ensured even when the braking force of the parking brake decreases somewhat. Therefore, the control unit 14 may re-perform the clamp control when the inclination angle of the vehicle is larger than or equal to a predetermined value. Thereby, it is possible to improve the power consumption efficiency.

Next, a specific operation of the electric parking brake device 100 according to the embodiment of the present invention will be described. First, an ideal motor current supply pattern for defining the standard supply time Ts_st and the standard waiting time Tw_st will be described.

Figure 2:
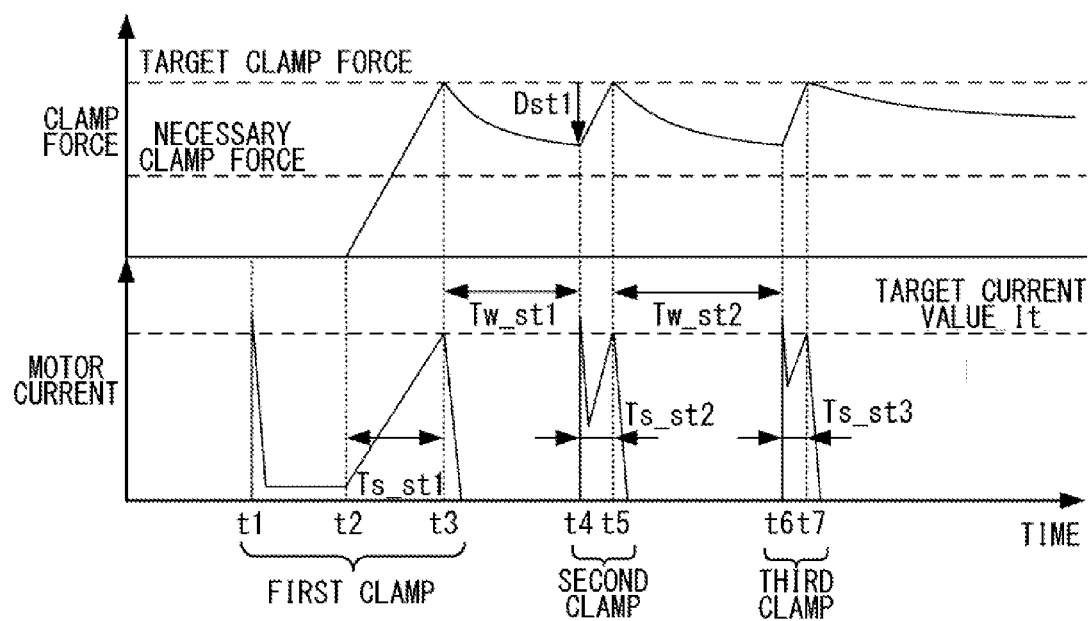
FIG. 2 is a diagram showing a timing chart for explaining an ideal motor current supply pattern and an ideal clamp force change pattern according to the ideal motor current supply pattern.

FIG. 2 is a diagram showing a timing chart for explaining an ideal motor current supply pattern and an ideal clamp force change pattern according to the ideal motor current supply pattern. The ideal motor current supply pattern and the ideal clamp force change pattern shown in FIG. 2 are determined by performing an experiment or a simulation under a predetermined ideal condition (initial temperatures of the pads and the disc rotor, an outside air temperature, a wind speed, and the like).

FIG. 2 shows a first clamp performed when the operation switch 30 is turned on and two re-clamps (referred to as a second clamp and a third clamp) performed after the first clamp.

In the first clamp, when the motor current is supplied at time t1, a rush current flows and the electric motor 21 starts rotating. However, at this time point, the pads 24 and 25 are apart from the disc rotor 23 and no load is applied to the electric motor 21, so that the motor current decreases to the no-load current. At this time, as shown in FIG. 2, no clamp force is generated.

Thereafter, when the disc rotor 23 is sandwiched by the pads 24 and 25 at time t2, a load is applied to the electric motor 21 and the motor current starts increasing in proportion to time. At this time, as shown in FIG. 2, the clamp force also increases in proportion to time.

Therefore, when the motor current value Im reaches the target current value It at time t3, the supply of the motor current is stopped. The target current value It is set to a value that achieves a target clamp force obtained by adding a predetermined margin to a necessary clamp force. Here, the time period from the time t2 to the time t3 is a standard supply time Ts_st1 in the first clamp.

When the supply of the motor current is stopped at the time t3, as shown in FIG. 2, the clamp force gradually decreases. This is because the temperatures of the disc rotor 23 and the pads 24 and 25 decrease as the time elapses and contraction of the disc rotor 23 and the pads 24 and 25 occurs. The clamp force decreases in proportion to the decrease in the temperatures of the disc rotor 23 and the pads 24 and 25.

Thereafter, at time t4 after a standard waiting time Tw_st1 elapses from when the motor current is stopped in the first clamp, the supply of the motor current is restarted and the second clamp is performed. The decreased clamp force recovers to the target clamp force by the second clamp. The standard waiting time Tw_st1 is set so that the clamp force is not smaller than the necessary clamp force. In the second clamp, a load is already applied to the electric motor 21 at the time t4 at which the supply of the motor current is started, so that a time period from the time t4 to time t5 at which the supply of the motor current is stopped is a standard supply time Ts_st2 in the second clamp.

Thereafter, at time t6 after the standard waiting time Tw_st2 elapses from when the motor current is stopped in the second clamp, the supply of the motor current is restarted and the third clamp is performed. The decreased clamp force recovers to the target clamp force by the third clamp. The standard waiting time Tw_st2 is set so that the clamp force is not smaller than the necessary clamp force. A time period from the time t6 at which the supply of the motor current is started to time t7 at which the supply of the motor current is stopped is a standard supply time Ts_st3 in the third clamp.

The ideal motor current supply pattern and the ideal clamp force change pattern according to the ideal motor current supply pattern have been described. Although, in FIG. 2, the first to the third clamps are shown, the same clamp operation may be repeated. In the electric parking brake device 100 according to the embodiment, the waiting time between the clamp operations is set on the basis of the standard supply time Ts_st1, Ts_st2, Ts_st3, and so on and the standard waiting time Tw_st1, Tw_st2, and so on in the ideal motor current supply pattern.

Figure 3:
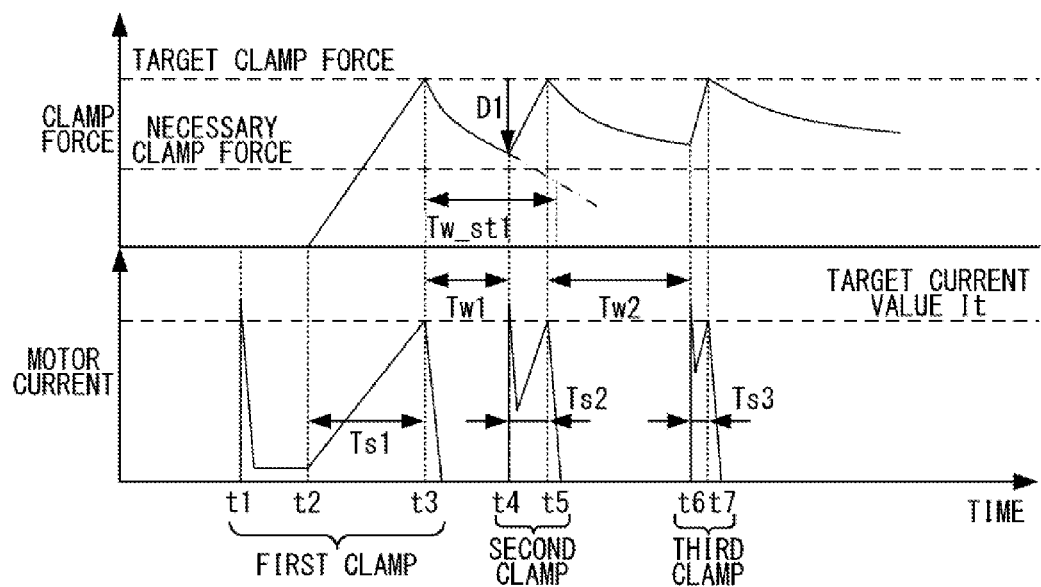
FIG. 3 is a diagram for explaining an operation of the electric parking brake device when temperatures of pads and a disc rotor are higher than an ideal condition.

FIG. 3 is a diagram for explaining an operation of the electric parking brake device when the temperatures of the pads and the disc rotor are higher than an ideal condition. FIG. 3 also shows a timing chart of a motor current supply pattern and a clamp force change pattern according to the motor current supply pattern.

FIG. 3 also shows the first clamp performed when the operation switch 30 is turned on and the second and the third clamps performed after the first clamp.

In the first clamp, when the operation switch 30 is turned on at the time t1, current is supplied from the current supply unit 11 to the electric motor 21. As shown in FIG. 3, a rush current flows immediately after the supply of the current is started, and the electric motor 21 starts rotating. However, no load is applied to the electric motor 21, so that the motor current decreases to the no-load current. At this time, as shown in FIG. 3, no clamp force is generated.

Thereafter, when the pad 25 comes into contact with the disc rotor 23 and the disc rotor 23 is sandwiched by the pads 24 and 25 at the time t2, a load is applied to the electric motor 21 and the motor current starts increasing in proportion to time. At this time, as shown in FIG. 3, the clamp force also increases in proportion to time. Here, in the example shown in FIG. 3, the time period from the time t1 to the time t2 is shorter than that in the ideal condition shown in FIG. 2. This is because the disc rotor 23 and the pads 24 and 25 are thermally expanded from the ideal condition, so that a load is applied to the electric motor 21 after a shorter time period from when the supply of the motor current is started.

Thereafter, when the motor current value Im reaches the target current value It at the time t3, the current supply unit 11 stops the supply of the motor current. The supply time measurement unit 12 measures a motor current supply time Ts1 from the time t2 at which a load is applied to the electric motor 21 and the motor current value Im starts increasing to the time t3 at which the motor current value Im reaches the target current value It.

When the supply of the motor current is stopped at the time t3, as shown in FIG. 3, the clamp force gradually decreases. Here, in this example, the temperatures of the disc rotor 23 and the pads 24 and 25 are higher than those in the ideal condition described in FIG. 2, so that decreases of temperature of the disc rotor 23 and the pads 24 and 25 per unit time are larger than those in the ideal condition. Therefore, in this example, decrease of the clamp force per unit time is larger than that in the ideal condition. Therefore, when the standard waiting time Tw_st1 elapses from the first clamp as in the case of the ideal condition, the clamp force may be smaller than the necessary clamp force as shown by the dashed-dotted line in FIG. 3.

Therefore, in the embodiment, the waiting time setting unit 13 varies a waiting time Tw1 on the basis of the motor current supply time Ts1 measured by the supply time measurement unit 12. The higher the temperatures of the disc rotor 23 and the pads 24 and 25, the larger and the softer the disc rotor 23 and the pads 24 and 25, so that the time period in which the electric motor 21 is driven with a load applied, that is, the motor current supply time Ts1, increases. The electric parking brake device 100 according to the embodiment takes the above into account and determines the waiting time Tw1 based on the motor current supply time Ts1.

Specifically, when the motor current supply time Ts1 is longer than the standard supply time Ts_st1, the waiting time setting unit 13 sets the waiting time Tw1 to be shorter than the standard waiting time Tw_st1 in the first clamp. Thereby, as shown in FIG. 3, the second clamp is started at the time t4 and the clamp force can be restored to the target clamp force before the clamp force becomes smaller than the necessary clamp force, so that the clamp force can be maintained to be larger than or equal to the necessary clamp force.

In the second clamp, a motor current supply time Ts2 is measured by the supply time measurement unit 12. The waiting time setting unit 13 sets a waiting time Tw2 from the second clamp to the third clamp on the basis of the motor current supply time Ts2. Specifically, when the motor current supply time Ts2 is longer than the standard supply time Ts_st2 in the second clamp, the waiting time setting unit 13 sets the waiting time Tw2 to be shorter than the standard waiting time Tw_st2. Thereby, as shown in FIG. 3, the third clamp is started at the time t6, so that the clamp force can be restored to the target clamp force. In and after the third clamp, the same control as that of the second clamp is repeated.

In an nth (n is an integer greater than or equal to 1) clamp, when a measured motor current supply time Tsn is shorter than or equal to a predetermined end determination time Ts_end, it is assumed that the decrease of the clamp force is small and no more re-clamp is required. Therefore, in this case, the waiting time setting unit 13 determines to end re-clamp to be performed next time and thereafter. Thereby, it is possible to prevent useless motor current from flowing into the electric motor 21, so that the efficiency of power consumption can be improved.

Figure 4:
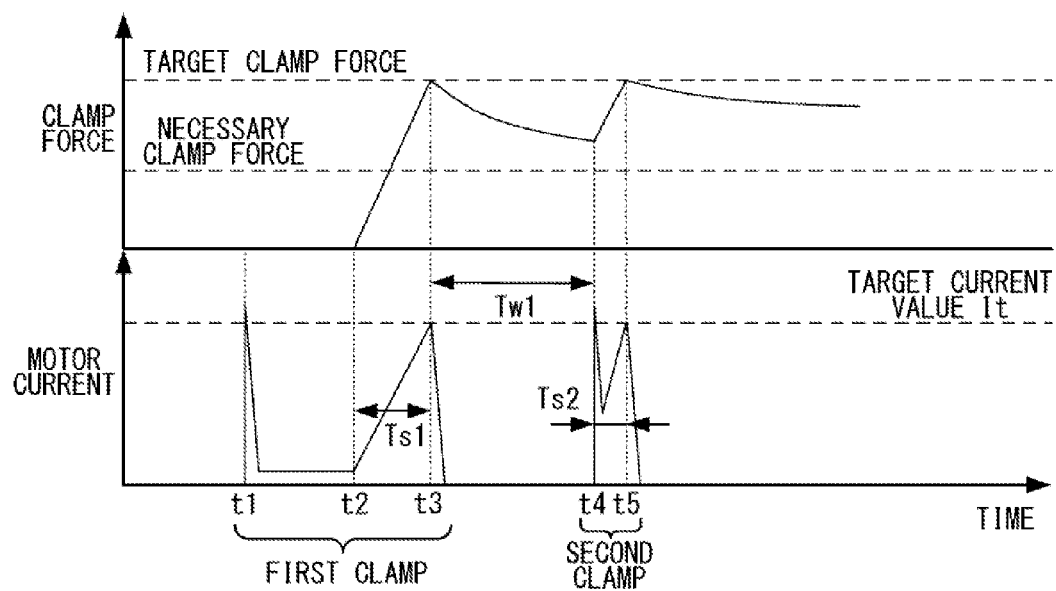
FIG. 4 is a diagram for explaining an operation of the electric parking brake device when temperatures of the pads and the disc rotor are lower than an ideal condition.

FIG. 4 is a diagram for explaining an operation of an electric parking brake device when the temperatures of the pads and the disc rotor are lower than the ideal condition. FIG. 4 also shows a timing chart of a motor current supply pattern and a clamp force change pattern according to the motor current supply pattern.

FIG. 4 shows the first clamp performed when the operation switch 30 is turned on and the second clamp performed after the first clamp.

In the first clamp, the motor current supply time Ts1 is measured by the supply time measurement unit 12 in the same manner as described above. The waiting time setting unit 13 determines the waiting time Tw1 based on the motor current supply time Ts1. In this example, the temperatures of the disc rotor 23 and the pads 24 and 25 are lower than those in the ideal condition, so that decreases of temperature of the disc rotor 23 and the pads 24 and 25 per unit time are smaller than those in the ideal condition. Therefore, in this example, decrease of the clamp force per unit time is smaller than that in the ideal condition. Thus, when the standard waiting time Tw_st1 elapses from the first clamp, the clamp force may not decrease so much in the same manner as in the ideal condition. If re-clamp is performed when the decrease of the clamp force is small, the number of re-clamps increases more than necessary and the efficiency of power consumption degrades.

Therefore, in the electric parking brake device 100 according to the embodiment, when the motor current supply time Ts1 is shorter than or equal to the standard supply time Ts_st1, the waiting time setting unit 13 sets the waiting time Tw1 to be longer than or equal to the standard waiting time Tw_st1 in the first clamp. Thereby, it is possible to prevent the second clamp from being performed while the clamp force does not decrease so much. Thus, the efficiency of power consumption can be improved.

In the second clamp, the motor current supply time Ts2 is measured by the supply time measurement unit 12. In this example, the motor current supply time Ts2 is shorter than or equal to the predetermined end determination time Ts_end, so that the waiting time setting unit 13 determines to end re-clamp to be performed next time and thereafter.

When the waiting time setting unit 13 sets the waiting time Tw in each clamp operation, the waiting time setting unit 13 may set the waiting time Tw to an optimal value according to a previously created map which defines a relationship between the motor current supply time Ts and the waiting time Tw. Such a map can be arbitrarily created by an experiment or a simulation.

The waiting time setting unit 13 may set the waiting time Tw by a proportional calculation. For example, as shown in FIG. 2, it is assumed that the decrease of the clamp force after the first clamp is Dst1 in the ideal condition. Further, as shown in FIG. 3, it is assumed that the decrease of the clamp force after the first clamp is D1 when the temperatures of the pads and the disc rotor are higher than those in the ideal condition. In this case, a ratio of D1 to Dst1 is equal to a ratio of the motor current supply time Ts1 to the standard supply time Ts_st1. Thus, the following formula (1) is established.

$$D1/Dst1 = Ts1/Ts\_st1 \quad (1)$$

Also, the ratio of D1 to Dst1 is equal to a ratio of the standard waiting time Tw_st1 to the waiting time Tw1. Thus, the following formula (2) is established.

$$D1/Dst1 = Tw\_st1/Tw1 \quad (2)$$

The following formula (3) can be derived from the formula (1) and the formula (2).

$$Tw1 = Ts\_st1 \times Tw\_st1/Ts1 \quad (3)$$

It is known that the waiting time Tw1 can be represented as a function of the motor current supply time Ts1 from the formula (3). The waiting time Tw of the second clamp and the following clamps can be set by the same proportional calculation.

FIG. 5 is a flowchart for explaining an operation of the electric parking brake device according to the embodiment of the present invention. The control flow shown in FIG. 5 is started when the operation switch 30 is turned on.

When the operation switch 30 is turned on, the control unit 14 sets a count value n of the number of clamp times to n=1 (S10).

Next, the control unit 14 performs clamp control (S12). In the clamp control, the motor current is supplied to the electric motor 21 by the current supply unit 11 and the motor current supply time Ts1 is measured by the supply time measurement unit 12. When the motor current value Im reaches the target current value It, the supply of the motor current is stopped.

Next, the waiting time setting unit 13 determines whether or not the motor current supply time Ts1 is longer than the standard supply time Ts_st1 (S14).

When the motor current supply time Ts1 is longer than the standard supply time Ts_st1 in the first clamp (Y in S14), the waiting time setting unit 13 sets the waiting time Tw1 to be shorter than the standard waiting time Tw_st1 in the first clamp (S16).

On the other hand, when the motor current supply time Ts1 is shorter than or equal to the standard supply time Ts_st1 in the first clamp (N in S14), the waiting time setting unit 13 determines whether or not the motor current supply time Ts1 is shorter than or equal to the end determination time Ts_end (S18).

When the motor current supply time Ts1 is longer than the end determination time Ts_end (N in S18), the waiting time setting unit 13 sets the waiting time Tw1 to be longer than or equal to the standard waiting time Tw_st1 in the first clamp (S20). On the other hand, when the motor current supply time Ts1 is shorter than or equal to the end determination time Ts_end (Y in S18), the control flow is ended.

After the waiting time Tw1 is set in S16 or S20, the control unit 14 determines whether or not the waiting time Tw1 has elapsed (S22). If the waiting time Tw1 has not elapsed (N in S22), the control unit 14 waits until the waiting time Tw1 elapses. On the other hand, if the waiting time Tw1 has elapsed (Y in S22), the control unit 14 determines whether or not re-clamp is necessary on the basis of information from the shift position sensor 32 and/or the inclination angle sensor 33 (S24).

When the control unit 14 determines that re-clamp is necessary (Y in S24), the control unit 14 increments the count value n of the number of clamp times (S26), returns to S12, and performs the second clamp control. On the other hand, when the control unit 14 determines that re-clamp is not necessary (N in S24), the control unit 14 ends the control flow.

As described above, according to the electric parking brake device 100 according to the embodiment of the present invention, the waiting time Tw until the next clamp control is set on the basis of the motor current supply time Ts, so that the braking force can be appropriately maintained.

For example, in the method which estimates the temperatures of the pad and the disc rotor on the basis of a change of vehicle speed, an outside air temperature, and the like and determines the wait time, if the temperatures of the pad and the disc rotor are not estimated accurately, there is a risk that re-clamp cannot be performed at an appropriate timing. However, in the electric parking brake device 100 according to the embodiment, a method which measures the motor current supply time is employed, so that it is possible to accurately measure the motor current supply time and re-clamp can be performed at an appropriate timing.

Although, in the above embodiment, the target current value It of the motor current is constant in each clamp control, the target current value may vary for each clamp. For example, the target current value is set to high in the first clamp control and the target current value may be gradually decreased in the next clamp control and the clamp controls thereafter.

The present invention has been described on the basis of the embodiment. The embodiment is an example, and it should be understood by those skilled in the art that various modified examples are possible in a combination of components and processes and the modified examples are also within a scope of the present invention.

REFERENCE SIGNS LIST

10: EPB-ECU, 11: current supply unit, 12: supply time measurement unit, 13: waiting time setting unit, 14: control unit, 20: electric parking brake, 21: electric motor, 22: caliper, 23: disc rotor, 24, 25: pad, 26: rotation to linear movement conversion mechanism, 27: body, 30: operation switch, 32: shift position sensor, 33: inclination angle sensor, 100: electric parking brake device.

INDUSTRIAL APPLICABILITY

The present invention can be used for an electric parking brake of a vehicle.

The invention claimed is:

1. An electric parking brake control device for generating a braking force by driving an electric motor to press pads to a disc rotor, the electric parking brake control device comprising:
    a current supply unit for supplying a motor current to the electric motor and stopping the supply of the motor current when the motor current reaches a predetermined target current value;
    a supply time measurement unit for measuring a supply time of the motor current;
    a waiting time setting unit for setting a waiting time from when the supply of the motor current is stopped to when the supply of the motor current is restarted next time on the basis of the measured motor current supply time; and
    a control unit for instructing the current supply unit to supply the motor current according to the set waiting time.

2. The electric parking brake control device according to claim 1, wherein
    the supply time measurement unit measures a time in which the motor current is supplied while a load larger than or equal to a predetermined value is applied to the electric motor as the motor current supply time.

3. The electric parking brake control device according to claim 1, wherein
    when the motor current supply time is longer than a predetermined standard supply time, the waiting time setting unit sets the waiting time to be shorter than a predetermined standard waiting time.

4. The electric parking brake control device according to claim 3, wherein
    when the motor current supply time is shorter than or equal to the predetermined standard supply time, the waiting time setting unit sets the waiting time to be longer than or equal to the predetermined standard waiting time.

5. The electric parking brake control device according to claim 3, wherein
when the motor current supply time is shorter than or equal to a predetermined end determination time which is shorter than the predetermined standard supply time, the waiting time setting unit ends the next and the following supplies of the motor current.

* * * * *